ELECTRONIC DISTRIBUTOR

Filed Dec. 31, 1956 2 Sheets-Sheet 1

INVENTOR
B. OSTENDORF, JR.
BY R. C. Perry
ATTORNEY

Aug. 29, 1961　　B. OSTENDORF, JR　　2,998,486

ELECTRONIC DISTRIBUTOR

Filed Dec. 31, 1956　　2 Sheets-Sheet 2

INVENTOR
B. OSTENDORF, JR.
BY R. C. Perry
ATTORNEY

United States Patent Office 2,998,486

Patented Aug. 29, 1961

2,998,486

ELECTRONIC DISTRIBUTOR

Bernard Ostendorf, Jr., Stamford, Conn., assignor to Bell Telephone Laboratories, Incorporated, New York, N.Y., a corporation of New York Filed Dec. 31, 1956, Ser. No. 631,880
5 Claims. (Cl. 178—52)

Figure 1:
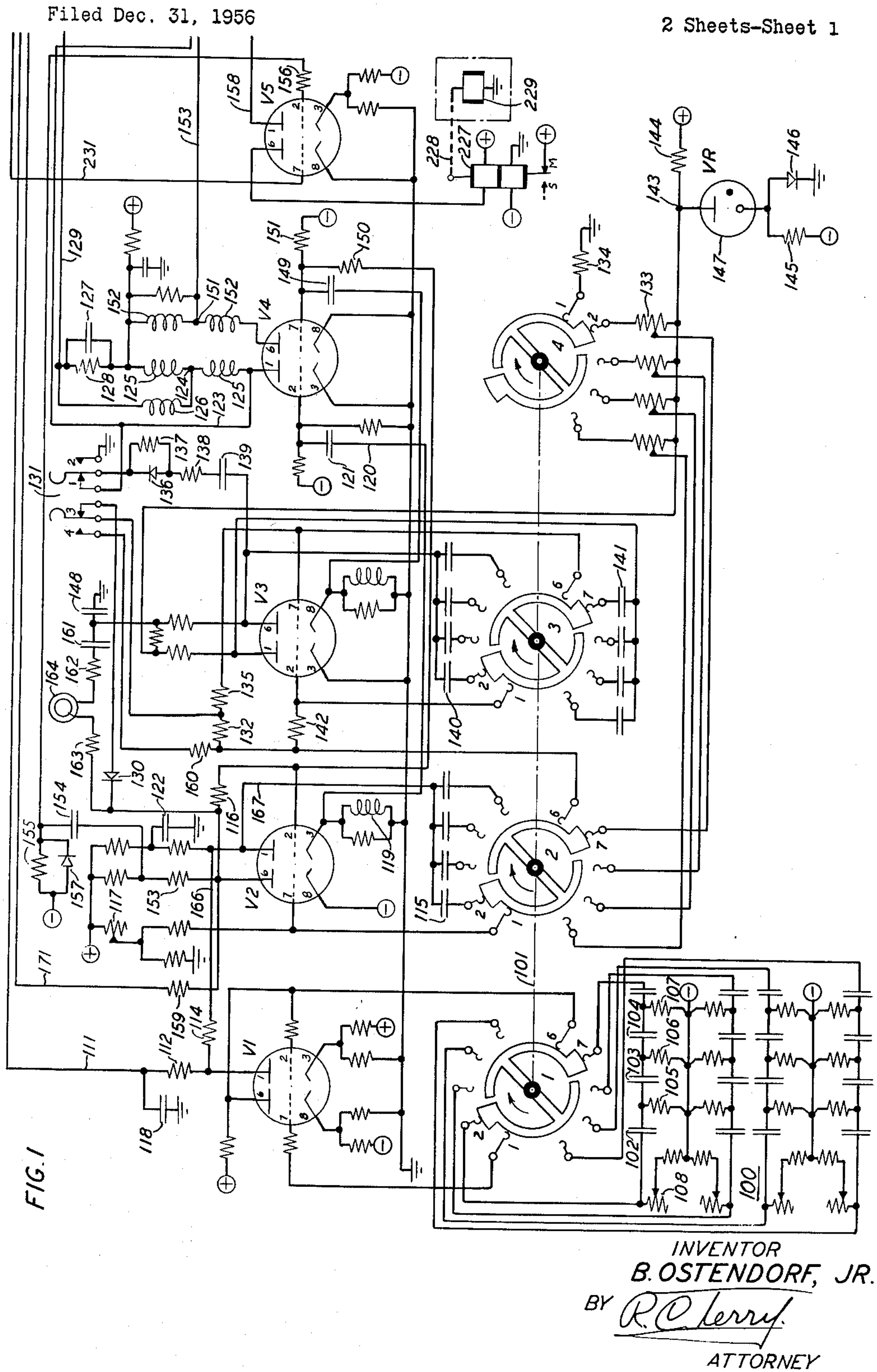

This invention relates to telegraph transmitters and particularly to electronic circuitry for the generation of start-stop teletypewriter signals.

An object of this invention is to provide an exclusively electronic teletypewriter signal distributor.

One object of this invention is to provide an electronic distributor capable of very high transmission speeds and arranged for rapid change of transmission speeds.

A further object is to electronically time the duration of teletypewriter signal elements, program the sequence of start-stop teletypewriter elements, control the application of these signal elements to the transmission line and establish the required transmission line conditions.

Another object of the invention is to time the transmission of a start-stop permutation code signal including a stop element of predetermined minimum duration in accordance with one cycle of an oscillator.

Another object of the invention is to provide an electronic permutation code signal transmitter capable of transmitting a stop element of different duration than other signal elements.

Another object of the invention is to provide flexibility in the determination of the relative durations of signal elements.

A feature of this invention is an electronic timing circuit, for timing teletypewriter signal elements, driven by a continuously running oscillator having a period of oscillation substantially equal to the transmission time of a teletypewriter character, or a summation of teletypewriter elements, and adjustable to provide a wide range of transmission speeds.

A further feature of this invention is a shift register means adaptable to the simultaneous read-in and sequential read-out of teletypewriter start-stop signal intelligence and arranged for maintaining line circuit conditions peculiar to teletypewriter start-stop signal transmission.

Another feature of this invention is electronic means to control the input of signal intelligence to the shift register means, to condition the shift register means for receipt of signal intelligence, to control the output of signal intelligence to the line, and to establish predetermined line conditions prior and subsequent to the transmission of signal intelligence.

This invention features a phase-shift oscillator having a period of oscillation substantially equal to the transmission time of a teletypewriter character or summation of teletypewriter code signal elements which activates an electron tube oscillatory circuit to establish transmission times of teletypewriter start-stop element and character signals.

Another feature of this invention is a frequency checking circuit which provides a convenient means for comparing the frequency of the element timing and character timing portions of the electronic oscillatory circuit with that of the phase-shift oscillator.

The principal components of this invention are a shift register, a continuously operating phase-shift oscillator and a free running multivibrator and a univibrator timing circuit.

The shift-register circuit consists of six identical interconnected bistable element stages each having two conditions of currents and voltages either of which will be maintained indefinitely until a change to the other state is forced by a conditioning impulse from an external circuit. In this invention these bivalue states are utilized to register and represent marking and spacing conditions corresponding to a teletypewriter permutation code combination. The stages of the drift register are connected to the other components of the distributor, which components provide conditioning impulses, and are interconnected to provide for transfer of marking and spacing conditions from each stage to the next higher numbered stage. A simulated marking stage preceding the first stage of the shift register determines the terminal condition of the permutation code signal combination stored in the shift-register circuit.

Other components of the system can force a change of state in the shift register stages by the application of three types of conditionng impulses which will be referred to herein as a set-to-space impulse, a read-in impulse, and a shift pulse.

The univibrator portion of the timing circuit when activated controls the application of the set-to-space and read-in pulses to the shift register by means of an impulse producing circuit. The application of the set-to-space pulse, under the control of the univibrator circuit, will cause the sixth or output stage of the shift register to be changed to a spacing condition as well as all other stages of the register that are in a marking condition at the time th.s impulse is applied. Ths action conditions the last or output stage of the register to initiate transmission of the spacing start condition required at the beginning of a permutation code combination.

When activated, the univibrator circuit also controls application of the read-in pulse to the register to condition the remaining five stages in accordance with the marking or spacing pattern of a code combination set up by an external coding circuit.

The univibrator determines the total number of character elements including the start and selectable elements of the teletypewriter character to be transmitted and has a period of cyclical operation approximately equal to the transmission time of a teletypewriter character at the speed of transmission being used and is herein referred to as the character timer.

The free running multivibrator portion of the timing circuit, when activated into symmetrical flip-flop operation, has a period of oscillation equal to the transmission time of one elemental component of the teletypewriter character to be sent. Once each cycle of the multivibrator, shift pulses are applied to all stages of the register thereby to change each stage of the register to the state formerly existing in the preceding stage. Accordingly, the marking or spacing conditions registered by the set-to-space and read-in pulses are advanced sequentially to the register output stage by a series of shift pulses, which are produced at intervals equal in length to a signal element of the teletypewriter character to be sent, under the control of the multivibrator timing circuit which will be referred to herein as the element timer.

In every start-stop teletypewriter character the output condition following the last selectable element must be a marking condition, therefore, in this invention a marking stage preceding the first stage of the shift register is simulated in order that the final shift pulse will result in the conditioning of the last shift register stage to marking, which will be the end result of transmission of a teletypewriter character due to the sequential shifting of the marking condition to successive stages of the shift register.

The phase-shift oscillator operates at a rate of one cycle per teletypewriter character transmission time and controls the transmission speed of the permutation code signal combination by activating the character timer, which in turn activates the timing multivibrator, thereby to initiate the sending of conditioning impulses to the shift register. The phase-shift oscillator supplies an output wave, of a predetermined frequency equal to the desired transmission time of a teletypewriter character, to the univibrator circuit which is activated at a predetermined point in the output wave and in turn activates the multivibrator circuit to control the registering and timed sequential read out of the teletypewriter code character combination to be transmitted.

In accordance with a preferred embodiment of the invention, a continuously running oscillator adjusted to a fixed frequency by a phase-shift network supplies an output wave having a period of cyclical operation equal to the transmission time of one teletypewriter character. The constant frequency oscillator constitutes the input to a triode amplifier. The amplifier plate output is either grounded or applied to a one-shot multivibrator or univibrator timing circuit, under the control of external circuitry. Upon removal of the ground the output wave of the oscillator amplifier is applied to the univibrator and at the first negative going transition of the amplifier output the univibrator is reversed from its idle state to its activated timing condition, and will remain in the activated state until a time determined by a condenser timing circuit, after which it will be flipped again to the idle condition to await the next negative going transition of the oscillator amplifier output wave. When the univibrator changes state it triggers the following tubes and initiates the following operations:

(1) A set-to-space triode is forced conductive and a pulse is sent to a shift register, to set all stages of said register to spacing. As the sixth stage which is connected to a signal output triode is rendered spacing, a spacing start element will be impressed on the outgoing line circuit.

(2) A step triode will be forced conductive, thereby to set up on the input leads to the shift register, the elements of a character code combination to be transmitted.

(3) A read-in triode will be forced conductive thereby to send a pulse to the shift register to open the gates of the input leads of the register in order that the signal conditions on the leads may be read into the corresponding stages of the register.

(4) An element timing multivibrator is triggered into symmetrical operation having a period equal to the time of one element of a teletypewriter character. This timing cycle will continue until the character timing univibrator returns to its idle state. At each cyclical operation of the element timing multivibrator, a shift pulse from a shift triode is applied to the shift register thereby to cause sequential transmission of the teletypewriter code elements established in the shift register stages. The first stage of the shift register is preceded by a potentiometer arrangement set to marking, so that the last signal fed to the output stage of the shift register will aways be marking, to transmit the stop condition.

(5) A marking hold on the signal output triode is removed by the univibrator upon its change of state, thereby to place the output triode under the control of the shift register.

A capacitor switching arrangement permits time constants of the oscillator and timing circuits to be varied thereby enabling the transmission times to be rapidly changed. It is also possible by adding shift register stages and changing the time constants of the phase-shift oscillator and the timing circuits to transmit start-stop teletypewriter signals having additional selectable elements.

A frequency checking circuit enables the element timing and character timing waves to be applied to a test terminal, so that an oscilloscope connected between that point and ground will show the relation between the element and character timing waves.

Figures 2, 3:
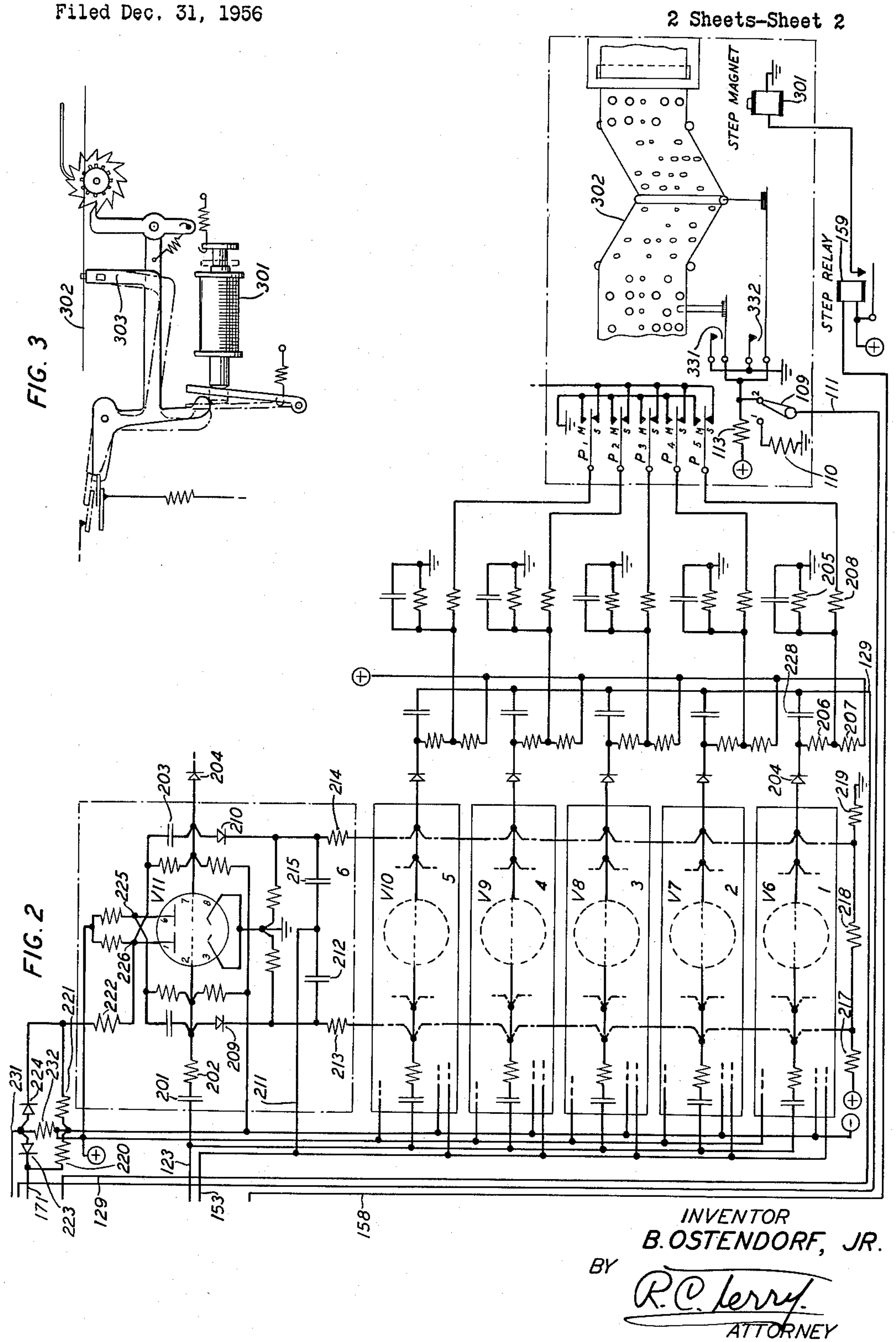

For a complete understanding of the invention, reference may be had to the following detailed description to be interpreted in light of the accompanying drawings wherein:

FIGS. 1 and 2, when arranged with FIG. 2 at the right of FIG. 1, show complete circuits of an embodiment of a telegraph sending distributor according to the present invention; and, FIG. 3 is a diagrammatic view showing a feeding and sensing mechanism for perforated tape.

The invention will be described as transmitting signals to a teletypewriter represented by selector magnet 229, operating on the start-stop principle using a five unit code. A perforated paper tape is fed through a teletypewriter transmitting head provided with contact controlling levers that sense the perforations in the tape in a manner well known in the art and represented by the dotted area of FIG. 2. The contact levers control the potentials applied to leads P1 to P5. The tape is advanced one step on the transmission of each character by known means controlled by stepping magnet 301 and illustrated in FIG. 3.

Referring to FIG. 1, reference numeral 100 designates a bank of phase-shifting networks, each network comprising three L sections. As is well known in the art, a three L section network will provide a phase shift of 180 degrees, and due to the fact that the reactance of the capacitors of the network vary with frequency, the combination of three L sections will afford a 180 degree phase shift at only one particular frequency. Four phase-shifting networks are shown in FIG. 1, however, it is to be understood that any number of networks could be added to provide for any number of fixed frequency circuits. Bank 1 of control switch 101 connects the various phase-shift networks between the anode and grid of the left-hand triode of tube V1 which operates continuously as a phase-shift oscillator. For instance, in the condition of control switch 101 shown in FIG. 1, bank 1 connects the uppermost or top phase-shift network comprising capacitors 102, 103, and 104 and resistors 105, 106, and 107 between the grid 7 and plate 6 of the left-hand triode of tube V1. Grid 7 of this tube is connected through contacts 1 and 2 of bank 1 to one end of the uppermost phase-shift network, and plate 6 is connected through contacts 6 and 7 of bank 1 to the other end of the same network. Potentiometer 108 provides a fine adjustment of the output frequency of the left-hand triode of tube V1. Accordingly, when the left-hand triode of tube V1 is associated with the uppermost phase-shift network, and potentiometer 108 is adjusted to give a particular oscillation frequency having one cycle substantially equal to the desired transmission time of a teletypewriter character, triode 6—7—8 will operate continuously at that rate. Similarly, as the control switch 101 is rotated to different positions, bank 1 of the switch will connect others of the phase-shift networks into the circuit of the left-hand triode of tube V1, thereby to provide a variety of fixed frequency oscillations corresponding to various teletypewriter character transmission speeds.

Therefore a sinusoidal wave at a particular frequency is available at the output of the left-hand triode of tube V1 to determine the number af characters transmitted per minute in steady, uninterrupted transmission.

The right-hand triode of tube V1 serves as an amplifier of the wave generated by the left-hand or oscillator section, and is controlled so as to operate as a buffer and control gate between the sine wave oscillator triode and the other circuits of the distributor. The output signals at plate 6 of the left-hand triode of tube V1 are applied to grid 2 of the right-hand amplifier triode section and will appear amplified and squared at plate 1 of this latter triode because it operates as an overloaded amplifier, changing abruptly between saturation and cut off. However, if switch 109 of FIG. 2 is closed on its distributor stop contact 1, ground will be applied to plate 1 of the right-hand section of tube V1 over a path extending from ground through resistor 110, switch 109, conductor 111, and resistor 112 to the plate 1 of the right-hand triode of tube V1. The application of this ground will reduce the effective voltage on plate 1 to a point at which the sine wave applied to the grid 2 will produce no voltage changes at plate 1. Accordingly, switch 109 of FIG. 2 controls the operation of the electronic distributor by preventing the sinusoidal output wave developed at plate 6 of the left-hand triode of tube V1 from being amplified and applied to the other circuits of the distributor via plate 1 of the right-hand triode of tube V1.

However, if switch 109 of FIG. 2 is on its distributor run contact 2, plate potential is applied through resistor 113, switch 109, over conductor 111, and through resistor 112 to plate 1 of the right-hand triode of tube V1, thereby allowing the oscillator and squaring amplifier to produce an effective output. It will also be noted with reference to the section of FIG. 2 enclosed in the dotted rectangle that in the event of torn tape or taut tape conditions either the tape out or tape stop contacts, reference numerals 331 and 332 respectively, will close to complete a circuit to ground from switch 109, thereby shorting out the 130-volt plate source to prevent the right-hand amplifier triode of tube V1 from passing signals.

*Character timing*

The triodes of tube V2 comprise a univibrator or one-shot multivibrator circuit having one triode cut off and the other triode normally conducting and requiring a single trigger pulse to complete a complete cycle of flip-flop operation. The left-hand triode 6—7—8 is normally conducting and the right-hand triode 1—2—3 is normally non-conducting in tube V2.

When switch 109 is placed on its contact 2 the output of the right-hand or amplifier triode 1—2—3 of tube V1, appearing on plate 1 thereof, is applied through resistor 114, conductors 166 and 167, capacitor 115, contacts 2 and 1 of bank 2 of control switch 101, to grid 7 of the left-hand triode of tube V2. As previously described, the left-hand triode of tube V1 is continuously oscillating and any positive going transition of the plate of the amplifier or right-hand triode of tube V1, upon or after connection of plate potential to conductor 111 in FIG. 2, will cause univibrator V2 to be held more firmly in its idle rest condition as grid 7 of the left-hand or normally conducting triode, will be driven more positive. However, at the first negative going transition of the timing wave at plate 1 of tube V1, grid 7 of tube V2 will be forced negative with a resultant positive condition at its plate 6. Grid 2 of the right-hand triode of tube V2 is coupled through resistor 116 to plate 6 of the left-hand triode and consequently grid 2 will also become more positive. Due to the squaring effect of the right-hand triode 1—2—3 of tube V1, this action takes place during the most rapid change of the timing wave; that is near the zero of the negative going transition.

Accordingly grid 2 of the right-hand triode of tube V2 is driven sufficiently positive to cause the character timing circuit of tube V2 to be flipped to conduction in the right-hand triode 1—2—3 and non-conduction in the left-hand triode 6—7—8. This condition is maintained until capacitor 115 builds up a relatively positive potential at grid 7 of the left-hand triode to restore the character timer univibrator circuit of tube V2 to the idle rest condition.

The capacitance value of capacitor 115 is selected to establish a restoration time of the character timing circuit of tube V2 at a value equal approximately to the transmission time of 6½ element lengths of a teletypewriter character at the particular teletypewriter operating speed corresponding to the setting of control switch 101. Each of three other capacitors may be connected in the grid circuit of triode 6—7—8 of tube V2 by rotating bank 2 of control switch 101, and they have capacitance values corresponding to the other phase-shift networks which may be connected into the oscillator circuit of tube V1 by bank 1 of the control switch 101, thereby to establish several circuit timing constants bearing relation to a number of teletypewriter operating speeds. Potentiometer 117 in the charging circuit for capacitor 115 provides a fine control of the restoring time of the univibrator V2.

If switch 109 is left in its operating position on contact 2 for several character times, the second and subsequent character transmission cycles will begin at regular intervals since the relation between one cycle of the character timing tube V2 and one cycle of tube V1 is such that the first transition of the timing wave from the amplifier or right-hand triode of tube V1 after tube V2 has timed out and restored is toward negative and thus restarts the character timing tube V2 by transferring the circuit from its idle rest condition to its off-normal condition as previously described.

Capacitor 118 and resistor 112 comprise an R-C filter network which acts to delay conduction of the right-hand oscillator amplifier triode of tube V1, to avoid a false timing of univibraotr V2. For example, if the oscillator amplifier triode 1—2—3 of tube V1 were allowed to pass the timing wave immediately after operation of switch 109 to its contact 2, the first character might be falsely timed if the square wave timing output from tube V1 were negative going at that instant. The R-C filter network of capacitor 118 and resistor 112 prevents application of a sharp negative transient to the character timer tube V2 regardless of the grid potential of amplifier triode of tube V1 at the time switch 109 is operated to its contact 2.

The character timer tube V2, when activated at the beginning of each teletypewriter character, provides five supervisory signals for the control of other circuit functions.

(1) An impulse to grid 2 of the step-pulse amplifier tube V5.

(2) An impulse to grid 2 of the set-to-space and read-in pulse amplifier, triode 1—2—3 of tube V4.

(3) Removal of a negative holding condition at grid 7 of element timer tube V3.

(4) A positive bias on grid 7 of the shift-pulse amplifier, triode 6—7—8 of tube V4.

(5) Removal of a marking-holding condition on the signal output amplifier, triode 6—7—8 of tube V5.

*Step-pulse*

When the univibrator character timing circuit of tube V2 is actuated at the beginning of transmission of each teletypewriter character, a voltage change toward positive occurs at plate 6 of tube V2. A portion of this voltage change is applied to grid 2 in the right-hand triode of tube V5 over a path extending from plate 6 of tube V2, resistor 153, capacitor 154 and grid resistor 156 to grid 2 of tube V5. A charging circuit consisting of resistor 155 paralleled by diode 157 is connected between a negative voltage source of 48 volts and the conductor connecting capacitor 154 to grid resistor 156. The time constant of this circuit is such that the period of conduction in triode 1—2—3 of tube V5 is approximately 25 milliseconds. The positive voltage swing applied to grid 2 of triode 1—2—3 of tube V5 forces current to flow in the plate circuit of this triode extending over conductor 158 and the winding of stepping relay 159 to positive battery. Relay 159, upon operating, will close an operating circuit for the stepping magnet 301 of a tape reading mechanism shown schematically in the portion of FIG. 2 enclosed in the dotted-line rectangle, and structurally in FIG. 3. Magnet 301 advances perforated tape 302 one step and allows the sensing levers 303 to sense the code combination then presented to them, and to code the elements of the combination on leads P1 through P5 of the shift register to be described hereinafter. In this manner a new character code is impressed on the input leads to the shift register at each cycle of the character timing circuit V2, by grounding these leads in a permutation combination corresponding to the perforations in the tape.

At the end of the character timing period, triode 6—7—8 of tube V2 becomes conducting, with a resultant negative going transition of its plate 6 which is applied as a pulse to grid 2 of tube V5 over the path previously traced. This pulse is, however, very short inasmuch as the charging current for capacitor 154 is provided through the low forward impedance of diode 157 for negative pulses. In this manner the step pulse amplifier circuit of triode 1—2—3 of tube V5 is conditioned for the next positive stepping impulse in the relatively short interval between the restoration of the univibrator character timer tube V2 and the activation thereof at the beginning of the next teletypewriter character.

*Shift-register*

Referring to FIG. 2, the shift-register circuit consists of six identical twin triode stages comprising tubes V6 through V11 and the circuit of the final or output stage, V11, is shown in detail. The circuitry associated with tubes V6 through V10 is identical to that detailed with respect to tube V11. Each of the shift-register stages is bistable, having two conditions or states of currents and voltages each of which will be maintained indefinitely until a change to the other state is forced from the circuit of tubes V2, V3 or V4.

During the rest condition between transmissions of teletypewriter characters, all stages of the shift-register are conducting in their left-hand triodes 1—2—3 and are cut off in their right-hand triodes 6—7—8. This is designated as the marking condition and is the end result of transmission of the preceding teletypewriter character as will be described hereinafter.

*Set-to-space and read-in impulses*

As described in the foregoing, activation of the character timing tube V2 by transfer of conduction from its left-hand to right-hand side, resulted from a transition toward positive at grid 2 of the right-hand triode of tube V2. By cathode-follower action, cathode 3 of tube V2 also becomes positive and, due to the presence of inductor 119 in the cathode circuit, supplies a positive impulse to grid 2 the left-hand triode of tube V4 by way of conductor 120 and capacitor 121. The build-up of this impulse is aided by the action of capacitor 122 in holding plate 1 of the right-hand triode of tube V2 at nearly full plate supply potential for a short interval after the right-hand triode 1—2—3 of tube V2 changes from the non-conducting to the conducting state.

The positive impulse applied to grid 2 of the amplifier triode 1—2—3 of tube V4 results in an amplified negative impulse at the plate 1 of this triode. This amplified negative impulse is applied over conductor 123 to all of the shift-register stages and acts to condition all of these stages to the spacing condition. This set-to-space negative impulse appearing on conductor 123 is coupled to the grids 2 of all shift-register stages by individual series capacitors and resistors and forces triodes 1—2—3 of tubes V6 through V11 to the cut-off condition.

For example, referring to tube V11 which is shown in detail, the negative impulse on conductor 123 is coupled by means of capacitor 201 and resistor 202 to grid 2 of the left-hand triode of tube V11. Cut off of triode 1—2—3 of tube V11 by the negative impulse on grid 2 is accompanied by a change toward positive at the plate 1 which change is coupled by way of capacitor 203 to grid 7 of tube V11 where an impulse toward positive appears. Accordingly, triode 6—7—8 of tube V11 will be forced conductive. The resistive cross-coupling between plates 1 and 6 and grids 7 and 2 respectively, of tube V11 maintains this state of the shift-register stage after the initial impulse has decayed. This description of the effect on tube V11 of the application of the set-to-space impulse over conductor 123 applies to the other stages comprising tubes V6 through V10, which are affected in an identical manner.

Thus the application of the set-to-space pulse sets all shift-register stages to the spacing condition thereby to initiate transmission of the spacing start signal by the output or final stage 6, containing tube V11, and to prepare the remaining stages, containing tubes V6 through V10, for the read-in of the marking elements of the teletypewriter character to be transmitted, which have been established on leads P1 to P5 in response to the stepping pulse as described previously.

The positive impulse applied to grid 2 in the left-hand triode of tube V4, also produces a negative or read-in impulse at terminal 124 of the plate circuit transformer 125. The read-in impulse is delayed by a network consisting of inductor 126, capacitor 127, and resistor 128, consequently the read-in impulse is applied over conductor 129 after the set-to-space impulse has decayed to a small amplitude. The net effect of this timing relation is to delay the opening of the shift-register read-in gates until after the shift-register stages have all been set to the spacing condition.

The read-in impulse, delayed with respect to the set-to-space impulse, as described above, is applied over conductor 129 to the five gate circuits, one for each of the first five stages of the shift-register containing the circuits of tubes V6 through V10. These gates are open, to permit passage of the read-in impulse, in those stages which have ground applied to their associated control leads P1 through P5 from tape sensing contacts in the marking condition. If a particular gate is open, due to the application of ground thereto, the negative read-in impulse passes through the gate to grid 7 of the associated shift-register stage, thereby to force triode 6—7—8 of the tube in that stage to the cut-off condition. This in turn forces the left-hand triode 1—2—3 to a conductive state by way of the cross-coupling between the plates and grids of the two triodes. Conduction in the left-hand triodes 1—2—3 of tubes V6 through V10 represents the marking condition for the stages, and as previously described, this condition will be maintained until a change of state is again forced by an external circuit.

A detailed description of this gating action will be given for the stage containing tube V6 as exemplary of operations in the stages 1 to 5. The circuitry of tube V6 is identical to that shown for tube V11, to which reference may be had for components of a shift-register stage. As a result of the set-to-space impulse which forced conduction in triode 6—7—8 of tube V6, grid 7 of this tube will approach ground potential and, therefore, approximately ground potential will be applied to the positive terminal of diode 204. The negative terminal of diode 204 is connected to resistor 206 of a network which also includes resistors 205, 207 and 208, each of which has one end connected to a common terminal. Resistors 205, 206 and 207 have their other ends connected respectively to ground, to the diode 204 and to positive battery. Ground is connectable to resistor 208 through input lead 5 and the associated tape sensing contact for a marking code element. In the absence of ground via resistor 208, a positive potential of approximately 8.5 volts is established at the negative terminal of diode 204. With diode 204 so biased the gate presents a high impedance to a negative read-in impulse of the order of 8.5 volts or less supplied over conductor 129 to capacitor 228. However, if lead P5 is grounded through its tape sensing contact, ground is connected to resistor 208 and the network supplies to the negative terminal of diode 204 a potential only slightly above ground, resulting in a biasing voltage across the diode of approximately zero. Accordingly the read-in impulse incoming over conductor 129 will pass through the diode gate and force grid 7 of tube V6 to a negative potential, thereby to set the stage to the marking condition by cutting off conduction in triode 6—7—8 and establishing conduction in triode 1—2—3 by way of the cross-coupling between the plates and grids of the two triodes. The showing of diode 204 in the circuit of grid 7 of tube V11 is solely to illustrate the manner in which the read-in gating diodes are connected to the circuitry of stages 1 to 5. The sixth stage does not receive the read-in pulse, therefore, the read-in gating diode shown is not utilized and may be omitted.

Accordingly, after the set-to-space impulse has forced conduction in triodes 6—7—8 of tubes V6 to V10, thereby to represent the spacing condition, the read-in pulse applied to all stages will reverse conductivity in those stages having their associated input leads P1 to P5 grounded in accordance with the teletypewriter character to be transmitted.

The order of the shift-register stages is inverted from that of the elements of the teletypewriter character transmitted. Teletypewriter elements 1 to 5 are read into stages 5 to 1, respectively.

*Element timing*

As hereinbefore described, plate 6 in the left-hand triode of tube V2 is relatively negative in the idle rest condition of the character timing univibrator because that triode is conducting. Cathode 8, in the left-hand triode of tube V2, is connected to negative battery supply of a magnitude of approximately 48 volts. The voltage drop through the left-hand triode of tube V2 is approximately 20 volts. Accordingly, the negative condition at plate 6 in the left-hand triode of tube V2 is approximately 30 volts negative with respect to ground.

This negative voltage condition on plate 6 of tube V2 is applied to the cathode of diode 130 and thus the diode has a forward-biased condition in a path continuing from the anode of diode 130 through contact 3 of switch 131, resistor 132, contacts 6 and 7 of bank 2 of control switch 101, upper portion of potentiometer 133, contacts 2 and 1 of bank 4 of control switch 101, and resistor 134 to ground, and lower portion of potentiometer 133 and resistor 144 to positive battery. The junction of the lower portion of potentiometer 133 and resistor 144 is maintained at 87 volts positive by a voltage regulator circuit which will be described hereinafter.

Consequently diode 130 is forward-biased to approximately minus 30 volts with respect to ground. Grid 7 of triode 6—7—8 of tube V3 is connected through resistor 135 to diode 130 and is sufficiently negative to hold that triode cut off, thereby preventing flip-flop action of the element timer tube V3 which has its triodes interconnected in the configuration of a free-running multivibrator.

As described in the foregoing, when the univibrator character timer tube V2 is activated, at the first negative going transition of the timing wave of the oscillator amplifier triode 1—2—3 of the tube V1, grid 7 of tube V2 is forced negative with a resultant positive condition at its plate 6 thereof. The magnitude of the potential change at plate 6 of tube V2 toward positive is approximately 90 volts which results in a potential at plate 6 of tube V2 of approximately 60-volts positive with respect to ground. This positive voltage change on plate 6 of tube V2 causes a change toward positive at grid 7 of tube V3 in a circuit extending from plate 6 of tube V2, diode 130, contact 3 of switch 131, by way of resistor 135 to grid 7 of tube V3. However, grid 7 of tube V3 is limited to approximately ground potential due to the flow of grid current. Accordingly with grid 7 of tube V3 restricted from going further positive in accordance with the positive voltage change on plate 6 of tube V2, a potential results at the junction of resistors 132 and 135 which is less positive than the potential at plate 6 of tube V2. Diode 130 is thus back-biased, grid 7 of tube V3 is freed from its negative clamp and the element timing multivibrator tube V3 is free to start.

As described, when the character timing univibrator tube V2 is activated, a positive impulse is applied to grid 2 of the left-hand pulse amplifier triode of tube V4, which results in a negative impulse appearing at plate 1 of tube V4 which is applied over conductor 123 to the shift register. This negative impulse appearing on conductor 123 is also applied as a starting pulse to grid 2 of the left-hand triode of multivibrator V3, over a path extending from plate 1 of the left-hand triode of tube V4, conductor 123, contact 1 of key 131, through a circuit network comprising, in series, resistor 137 shunted by diode 136, resistor 138, capacitor 139, capacitor 140, and contacts 1 and 2 of bank 3 of control switch 101 to grid 2 in the left-hand triode of multivibrator tube V3.

The negative impulse appearing at grid 2 of the left-hand triode of tube V3 cuts off that triode and results in a positive transition at its plate 1. This positive transition at plate 1 of the left-hand triode of tube V3 is passed to grid 7 in the right-hand triode over a path extending from plate 1, capacitor 141, contacts 7 and 6 of bank 3 of control switch 101, to grid 7. The positive transition at grid 7 establishes conduction in the triode 6—7—8 and results in a negative transition at plate 6 in multivibrator tube V3. This negative transition at plate 6 of tube V3 is transferred through capacitor 140 and contacts 2 and 1 of bank 3 of control switch 101, to grid 2 of the left-hand triode of tube V3, thereby to maintain grid 2 negative for a time period determined by the value of capacitor 140, resistance 142 and the voltage applied by potentiometer 133 through contacts 6 and 7 of bank 2 of control switch 101. Accordingly, the setting of the control switch 101 corresponding to various teletypewriter transmission speeds establishes the time constant networks in the circuits of the character timing univibrator V2 and the element timing multivibrator tube V3 to coordinate their timing cycles with the desired transmission speeds.

As the negative voltage applied to grid 2 of the left-hand triode of tube V3 decays and grid 2 approaches zero potential, a change towards negative takes place at plate 1 and is passed to grid 7 of the right-hand triode by way of capacitor 141 and contacts 6 and 7 on bank 3 of control switch 101. This change at grid 7 of tube V3 results in a change towards positive at its associated plate 6, which is in turn passed to grid 2 in the left-hand triode over a path previously traced, and reinforces the relatively slow capacitor charge to produce a sudden interchange of conductive conditions of the left and right-hand triodes of tube V3.

Since capacitor 140 and capacitor 141 have identical values, the flip-flop action is symmetrical, that is, conduction will alternate between the triodes of tube V3 at uniform time intervals. In addition the action of the element timing tube V3 is self-sustaining as a multivibrator and will continue until the clamp by way of diode 130 is reapplied. Due to the timing of the univibrator character timing circuit of tube V2, this diode clamp will be reapplied about the middle of the seventh cycle of operation of the multivibrator element timing circuit of tube V3.

The plate and grid return circuits of the element timing multivibrator tube V3 are connected to a common source of 87-volts positive at terminal 143. This acts to stabilize the frequency of the multivibrator circuit inasmuch as an increase in grid return voltage tends to compensate for an increase in plate supply voltage.

In addition, further stabilization of the element timing multivibrator of tube V3 is provided by the voltage regulator circuit consisting of resistors 144 and 145, diode 146 and voltage regulator tube 147. Under normal operating conditions voltage regulator tube 147 is ionized and its cathode is held at ground potential by forward conduction through diode 146. Under these conditions the circuit acts as a conventional gas-tube voltage regulator circuit in which the cathode of the gas tube 147 is connected to ground. However, on initial application of power, diode 146 is back-biased from the minus 48 negative voltage supply acting through resistor 146. Therefore, until conduction begins in the voltage regulator tube 147, the anode to cathode potential of the voltage regulator tube is approximately 150 volts, which provides ample voltage margin for initiating conduction in the gas tube 147.

*Shift-pulse*

As previously described, the activation of the univibrator character timing circuit of tube V2, results in the application of a positive potential to grid 2, in the right-hand triode of tube V2. Cathode 3 of tube V2 is at approximately ground potential for direct current and relatively slow transients and, therefore, grid 2 will act as a diode to limit the potential to approximately ground. As grid 2 of tube V2 moves toward ground potential, grid 7 of tube V4, connected to grid 2 of tube V2 by way of resistor 150, will move from about minus 30 volts, established by the negative battery source and resistor 151, toward approximately 8 volts negative with respect to ground. This action is, however, delayed by the shunting effect of capacitor 149 which, for low frequency effects, is connected to ground at cathode 8 of tube V3. This delay in the build-up of a relatively positive bias at grid 7 of tube V4 acts to prevent operation of the shift-pulse amplifier right-hand triode 6—7—8 of tube V4, on the initial reversal of the multivibrator element timing tube V3.

Each time thereafter that the element timing multivibrator tube V3 becomes conducting in triode 6—7—8, an impulse towards positive is produced at cathode 8 by cathode-follower action. The build-up of each impulse is aided by action of capacitor 148 which holds plate 6 of tube V3 at nearly the full plate supply voltage for a short interval of time after triode 6—7—8 of tube V3 changes from the non-conducting to the conducting state. The positive impulses at cathode 8 of tube V3 are applied by way of capacitor 149 to grid 7 of the shift-pulse amplifier triode 6—7—8 of tube V4 and result in a series of negative impulses at plate 6 of tube V4. These latter negative impulses appear with somewhat lower amplitude at terminal 151 of plate transformer 152 and are applied over conductor 153 to all stages of the shift register thereby to control the shifting, from stage to stage, of signal elements which have been initially established in response to the set-to-space and read-in impulse to the shift register.

*Shifting*

As an example, and referring to the shift register of FIG. 2 the shifting process will be described with relation to tube V11 of the sixth stage to which the signal condition stored in tube V10 of stage 5 is to be shifted. It will be assumed that tube V11 is spacing, with triode 6—7—8 thereof conducting, and tube V10 is marking with triode 1—2—3 thereof conducting. The tube and circuit parameters are such under these conditions that diode 209 is back-biased by 24 volts and diode 210 is back-biased by 125 volts.

Under these circumstances a negative shift pulse of approximately 8 volts applied over shift-pulse conductor 153, conductor 211 and capacitor 215, will overcome the back-bias of 1.25 volts on diode 210 and drive grid 7 of tube V11 negative to cut off conduction in triode 6—7—8 and start conduction in the left-hand triode 1—2—3, to represent the working condition. The negative 8-volt shift pulse is also applied through capacitor 212, but cannot pass through diode 209 due to the back-bias of 24 volts, and hence cannot interfere with the change of state initiated at grid 7 of tube V11 through diode 210.

If, on the other hand, the stage associated with tube V11 and the stage associated with tube V10 are both marking, the circuit and tube parameters are such that the back-bias on diode 209 is 10.25 volts and the back-bias on diode 210 is 15 volts. Under these circumstances the negative 8-volt shift pulse can pass through neither diode, hence the state of tube V11 will not change.

Under the other two possible conditions, that is tube V11 marking and tube V10 spacing, or both tubes V10 and V11 spacing, the shifting action is identical to that just described except that the action at triode 1—2—3 of tube V11 is interchanged with the action at triode 6—7—8 of that tube. Consequently when the adjacent shift-register stages are in different states, the higher numbered stage will change state upon application of a shift pulse, however, when the stages are in the same state, no change will occur.

Considering the shift register of tubes V6 through V11 in its entirety, it is apparent that several stages may be required to change state simultaneously upon application of the common shift pulse. To insure a proper transfer from the lower numbered to the higher numbered stage of the condition previously existing in the lower numbered stage, it is required that the condition just prior to application of the shift pulse be remembered long enough to establish the new state in the succeeding stage. This short term memory is provided by an RC network of which the arrangement associated with tube V11 comprising resistors 213 and 214 and capacitors 212 and 215 is typical. The parameters of this network associated with tube V11 and the circuit parameters associated with networks corresponding to tubes V6 and V7 provide a time constant which is large compared with the transition or reversal time of a shift-register stage.

*Stop element*

In the transmission of every teletypewriter character the output condition which follows the last selectable element must be of a marking nature indicative of the stop element of the teletypewriter code. Accordingly, the last or sixth shift pulse received by the register must result in a marking condition being shifted into the sixth stage containing tube V11 of the shift register. This is accomplished in FIG. 2 by simulating a marking stage preceding the first stage associated with tube V6 in order that a marking condition is continuously shifted into the shift register. Thus, after six shift impulses, the entire register is in the marking condition and the marking output condition is maintained until the next set-to-space impulse is applied at the beginning of the next character transmission.

As set forth hereinbefore with reference to the shift-register stages associated with tubes V11 and V10, the change of state of the next succeeding tube is controlled by the biasing voltages existing across the gating diodes in the grid circuits of the succeeding stage. In tube V11 these diodes were designated by reference numerals 209 and 210. The stage containing tube V6, having identical circuitry to that of tube V11, will also have the grid circuit of the triodes connected through gating diodes similar to diodes 209 and 210 to the preceding stage. However, in the case of the stage associated with tube V6 the circuit will not be complete to the plates of preceding tubes, but will be connected to points on a potentiometer where they will pick off reference voltages which will correspond to the plate circuit voltages of a stage in the marking condition. The potentiometer network which provides the simulated marking voltages to change stage 1 associated with tube V6 to marking comprises resistors 217, 218 and 219 in serial relation between positive battery and ground. Grid 2 of tube V6 is connected through a gating diode to a junction point between resistors 217 and 218 of this network, and grid 7 of tube V6 is connected to a junction point between resistors 218 and 219 of this network.

Consequently, a marking condition continually shifted into the stage associated with tube V6 results in the conditioning of all stages of the shift register to marking after six shift pulses have been applied. Thus a marking output condition is maintained in the shift register until the next set-to-space impulse is generated at the beginning of the following teletypewriter character coded on the input leads of the shift register in response to the stepping pulse.

*Output network*

The output network between tube V11 in the sixth stage of the shift register and grid 7 of the left-hand triode 6—7—8 of tube V5, the signal output amplifier triode, will provide a marking output from the shift register whenever tube V11 of the sixth stage is marking or whenever the character timer univibrator tube V2 is in the idle or rest condition between the fifth element of the teletypewriter character and the start element of the next teletypewriter character. The provision of a marking output imposed by tube V2 when that tube is in the idle condition affords a safeguard against the transmission of a continuous spacing signal to the line in the event the output stage 6 associated with tube V11 is inadvertently set to spacing during a power failure or a maintenance and testing operation.

Either conduction or non-conduction may be provided for the output marking condition in the left-hand triode 6—7—8 of tube V5, depending upon whether the output network is connected to terminal 225 or terminal 226 of tube V11 as signals from either terminal may be used to drive the left-hand signal amplifier triode 6—7—8 of tube V5. The circuit and connections required to provide non-conduction of the signal amplifier triode 6—7—8 of tube V5, as the marking conditions are shown in FIG. 2.

Plate 6 of the character timing univibrator tube V2 is coupled to grid 7 of the signal amplifier triode 6—7—8 of tube V5 by way of resistor 159, conductor 171, diode 223 of FIG. 2 and conductor 231. Plate 1 of tube V11 is coupled to grid 7 of tube V5 by way of resistor 222, diode 224 and conductor 231. The cathodes of diodes 223 and 224 are connected through individual resistors 220 and 221 respectively to negative battery and their anodes are connected through common resistor 232 to positive battery. These connections tend to bias the two diodes 223 and 224 in the forward direction. Plate 6 of character timing tube V2 and plate 1 of the sixth stage shift-register tube V11 may be considered as two signal driving sources which are connected to grid 7 of the signal output amplifier triode 6—7—8 of tube V5. Diodes 223 and 224 are so poled that the more negative of these two plate sources will control the conduction of the signal output amplifier triode 6—7—8 of tube V5.

As described hereinbefore, during the idle rest condition of the character timing tube V2 plate 6 is approximately 30 volts negative with respect to ground. Consequently, during the idle condition of tube V2, the voltage applied to the negative terminal of diode 223 is more negative than the voltage applied to the negative terminal of diode 224. This condition obtains for both the marking and spacing conditions of tube V11. Under these conditions a forward-bias on diode 223 and a back-bias on diode 224 exists and, with the result that a negative bias is applied to grid 7 of tube V5, and consequently the signal output amplifier triode 6—7—8 is non-conducting, which is the marking state, during the idle rest condition of the distributor.

However, when the distributor character timer univibrator tube V2 is activated, plate 6 of tube V2 goes positive approximately 60 volts with respect to ground and provides a back-bias on diode 223 which renders triode 6—7—8 of tube V5 responsive only to control by tube V11 through diode 224. When the left-hand triode 1—2—3 of tube V11 is conducting in the marking condition, the lower voltage on plate 1 coupled to diode 224 provides a negative potential on grid 7 of tube V5 of sufficient magnitude to cut off triode 6—7—8. But when conduction is reversed in tube V11 to the spacing condition and triode 1—2—3 is cut off it is accompanied by a change towards positive at plate 1 which applies a positive potential through diode 224 to the grid 7 of signal output amplifier triode of tube V5, to cause conduction thereof as indicative of the spacing condition in the last stage of the shift register.

Thus it is apparent that regardless of the condition of shift-register stage associated with tube V11, the distributor output amplifier triode 6—7—8 of tube V5 is held non-conducting until the distributor character timing tube V2 is activated. When activation occurs output tube V5 becomes conducting, due to receipt of the normal set-to-space impulse by the shift register or because stage 6 of the shift register has been set to a spacing condition inadvertently. In either case a proper teletypewriter character will result since the first or start element of the character is always spacing and the second element will be shifted in the normal manner from the preceding or fifth shift-register stage.

As current flows in the plate circuit of the left-hand triode 6—7—8 of tube V5 to indicate a spacing condition, relay 227 having an operating winding in the serial path of the plate circuit will be energized. Relay 227 is operable to marking by current in its biasing winding when triode 6—7—8 of tube V5 is cut off, but its armature will go to the spacing terminal under domination by its operating winding upon conduction in the plate circuit of triode 6—7—8. Consequently, with no current in the plate circuit of the left-hand triode of tube V5, the armature of relay 227 engages the marking contact, and a marking condition is impressed on transmission line 228, and selector magnet 229 of a teletypewriter at a distant station will repeat the signals from the signal output amplifier triode of tube V5 to its associated teletypewriter in a manner well known in the art.

In the event that it is desired to have conduction in the left-hand triode 6—7—8 of tube V5 represent the marking condition, the control voltages will be derived from plate 1 of tube V2 and plate 6 of tube V11, and the network of resistors 159, 222, 220 and 221 and diodes 223 and 224 may be so arranged that the more positive of the two voltages applied to the positive terminal of diode 223 when tube V2 is normal will dominate grid 7 of the signal output amplifier triode 6—7—8 of tube V5 to cause conductivity therein. In this alternate arrangement, as in the one first described, conduction of the signal output amplifier is controllable by the marking or spacing condition of shift-register stage 6 only when the character timer tube V2 is activated. Current then flows in the plate circuit of tube V5 for a marking condition rather than a spacing condition, and the biasing winding of relay 227 is connected to provide a spacing bias.

A frequency checking circuit is incorporated in the electronic distributor to provide a convenient means of comparing the frequency of the element timing and character timing circuits of tubes V2 and V3, respectively, with that of the operations-per-minute oscillator triode 6—7—8 of tube V1.

The operation of the frequency test key 131 opens at its No. 3 contact the clamping circuit of diode 130 to make the element timing tube V3 "free running" and independent of the character timing tube V2. The operation of key 131 also transfers, at its No. 1 contact, the element timer tube V3 starting circuit from the read-in amplifier left-hand triode 1—2—3 of tube V4 to ground on contact 2. This operation eliminates application of the starting impulses to the element timer tube V3 but preserves the shunting effect of the starting circuit.

The element timing output wave of multivibrator V3 is applied to the frequency test point 164 by way of capacitor 161 and resistor 162 and the univibrator character timing output wave of tube V2 is applied to the same test point by way of resistor 163. Consequently, an oscilloscope connected between test point 164 and ground will show the relation between the element and character timing waves.

With the frequency test key 131 operated, resistor 160 is shunted across resistor 132 at contact 4 of the key. The resultant reduction in the resistance in the circuit of grid 7 of tube V3 slightly raises the frequency of that element timer circuit so that, with proper adjustment of the potentiometers associated with bank 4 of control switch 101; for example, potentiometer 133, 7½ element timing cycles (instead of 7.42) may be obtained during each cycle of the operations-per-minute oscillator. Inasmuch as each negative going transition of the oscillator triode 6—7—8 of tube V1 activates the character timing univibrator circuit of tube V2, the oscilloscope will show a stationary pattern of 7½ element timing cycles between successive points of activation of the character timing circuit of tube V2. In this way the highly accurate frequency of the phase shift oscillator is utilized to adjust the less accurate frequency of the element timer multivibrator.

It will be understood that various modifications may be made in this circuit, such as adding phase shifting networks, varying the constants of the timing circuits and the number of shift register stages to provide for additional or other transmission speeds and codes having more or less than five units, and substituting other signal sources for the perforated tape to supply potentials to the shift register on loads P1 to P5 and other signal utilization means than the teletypewriter selector magnet, without departing from the spirit of the invention.

What is claimed is:

1. A permutation code signal transmitter comprising an output circuit, a plurality of control connections, a multistage shift register having an end one of said stages operably coupled to said output circuit, transmission control means controllably connected with said shift register including an oscillator having a period of oscillation equal to the transmission time of a permutation code signal character combination and a univibrator activated under the control of said oscillator and at a predetermined point in the cycle thereof for invariably conditioning said end one of said stages according to the spacing element of a permutation code signal combination and for conditioning the remaining stages of said shift register according to the marking or spacing elements of a permutation code signal combination, other means controllably interconnecting said shift register and said univibrator circuit including a multivibrator circuit adapted to generate a predetermined number of cycles per cycle of said oscillator corresponding to the transmission time of a permutation code signal combination beginning directly under control of said univibrator circuit for successively shifting the marking or spacing element conditions of said remaining stages into said end one of said stages for corresponding controlling said output circuit, and further means controllably connected to said shift register for invariably conditioning the other end one of said shift register stages to the marking condition during the shifting initiated by said other means so that invariably a signal sequence comprising a spacing start element, a plurality of selectable elements and a marking stop element will be impressed upon said output circuit for each cycle of said oscillator.

2. A transmitter in accordance with claim 1 in which said transmission control means additionally includes an impulse producing network controlled by said univibrator for producing a first pulse to condition said end one and remaining stages of said shift register to represent spacing elements of a permutation code signal combination and for producing a second pulse delayed with respect to said first pulse to condition said remaining stages of said shift register to represent spacing or marking elements of a permutation code signal combination.

3. In a permutation code signal transmitter a multistage shift register, a plurality of control coupling connections, an output circuit operably coupled to an end stage of said shift register, a first impulse producing means controllably connected to said shift register for applying a first pulse to said end stage and to the remaining stages of said shift register to condition all stages to represent spacing elements of a permutation code signal combination, other means for selecting certain of said remaining stages for subsequent conditioning to represent marking elements of a permutation code signal combination, second impulse producing means controllably interconnecting said first impulse producing means and said shift register for applying a pulse delayed with respect to said first pulse to all of said remaining stages to condition the selected ones thereof according to the marking elements of a permutation code signal combination, third impulse producing means controllably connected to said shift register for impressing a series of pulses on all stages of said shift register to successively shift said marking and spacing element conditions established therein into said end stage for controlling said output circuit, and further means controllably connected to said shift register for invariably conditioning the other end one of said shift register stages to represent a marking element of a permutation code signal combination when said series of pulses are impressed upon said stages by said third impulse producing means.

4. A transmitter in accordance with claim 3 in which there is provided a free running oscillator having a period of oscillation equal to the transmission time of a character of the permutation code signal transmitted, and switching means controllably interconnecting said free-running oscillator with said impulse producing and said other means for causing activation of said first, second and third impulse producing means and said other means by said oscillator at predetermined points in a cycle thereof.

5. In a permutation code signal distributor, a multistage shift register having a number of stages greater by one than the number of intelligence conveying elements of a permutation code, a signal relaying device connected to and controllable by an end stage of said shift register, a first oscillator adapted to generate continuously a fixed frequency wave form having a period equal to the transmission time of one permutation code combination, driven oscillatory means, a timing circuit interconnecting said driven oscillatory means and said oscillator for activating said driven oscillatory means into an oscillatory condition at a predetermined point in the operating cycle of said oscillator, impulse producing means controlled by the activation of said driven oscillatory means for supplying a first conditioning pulse to said end stage and to the remaining stages to condition all stages to represent spacing elements of a permutation code signal combination and for producing a second conditioning pulse delayed with respect to said first pulse, a plurality of gating circuits associated with said remaining stages of said shift-register, coding means for simultaneously applying to said gating circuits a pattern of potentials representing a permutation code signal combination to open certain of said gates to cause conditioning of the associated shift register stages by said second conditioning impulse producing means to represent marking elements of a permutation code signal, a start-stop oscillator adapted to generate a predetermined number of cycles per cycle of said first oscillator each corresponding to the transmission time of an element of the permutation code signal combination beginning upon activation of said driven oscillatory means, still other impulse producing means controlled by said start-stop oscillator for supplying a series of conditioning impulses equal in number to the stages of said shift register at the rate of one pulse per cycle of said free running oscillator to all of the stages of said shift register for sequentially transferring the marking or spacing conditions established in said shift register into said end stage for transmission by said signal relaying device, means for invariably conditioning the other end stage of said shift register during the transfer initiated by still other impulse producing means to represent the marking elements of a permutation code signal combination and switching means interconnecting said signal relaying device, said first-mentioned end stage of said shift register and said driven oscillatory means for maintaining a predetermined condition of said relaying device during deactivated condition of said driven oscillatory means.

References Cited in the file of this patent

UNITED STATES PATENTS

| | | |
|---|---|---|
| 2,468,462 | Rea | Apr. 26, 1949 |
| 2,536,578 | Slayton | Jan. 2, 1951 |
| 2,585,282 | Slayton | Feb. 12, 1952 |
| 2,595,714 | Slayton | May 6, 1952 |
| 2,878,313 | Toulson | Mar. 12, 1959 |